US011397691B2

(12) United States Patent
Kalamatianos et al.

(10) Patent No.: US 11,397,691 B2
(45) Date of Patent: Jul. 26, 2022

(54) LATENCY HIDING FOR CACHES

(71) Applicant: Advanced Micro Devices, Inc., Santa Clara, CA (US)

(72) Inventors: John Kalamatianos, Boxborough, MA (US); Apostolos Kokolis, Urbana, IL (US); Shrikanth Ganapathy, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/683,142

(22) Filed: Nov. 13, 2019

(65) Prior Publication Data

US 2021/0141740 A1 May 13, 2021

(51) Int. Cl.
| | | |
|---|---|---|
| *G06F 12/00* | (2006.01) | |
| *G06F 12/126* | (2016.01) | |
| *G06F 12/0804* | (2016.01) | |
| *G06F 12/1027* | (2016.01) | |

(52) U.S. Cl.
CPC ........ *G06F 12/126* (2013.01); *G06F 12/0804* (2013.01); *G06F 12/1027* (2013.01); *G06F 2212/6042* (2013.01)

(58) Field of Classification Search
CPC ............... G06F 12/126; G06F 12/0804; G06F 12/1027; G06F 12/0802; G06F 12/0811; G06F 2212/6042
See application file for complete search history.

(56) References Cited

U.S. PATENT DOCUMENTS

| | | | | |
|---|---|---|---|---|
| 2014/0164713 A1* | 6/2014 | Sim | ...................... | G06F 12/0888 711/138 |
| 2019/0087350 A1* | 3/2019 | John | .................... | G06F 12/1027 |

OTHER PUBLICATIONS

Korgaonkar, K., et. al., "Density Tradeoffs of Non-Volatile Memory as A Replacement for SRAM Based Last Level Cache", 45th Annual International Symposium on Computer Architecture, IEEE, 13 pgs., Jun. 2018.
Zhang, Y., et. al., "Read Performance: The Newest Barrier in Scaled STT-RAM", IEEE Transactions on Very Large Scale Integration Systems, vol. 23, No. 6, IEEE, pp. 1170-1174, Jun. 2015.
Sun, Z., et. al., "Multi Retention Level STT-RAM Cache Designs With A Dynamic Refresh Scheme", Proceedings of the 44th Annual IEEE/ACM International Symposium on Microarchitecture, IEEE, 10 pgs., Dec. 2011.
Wang, J., et. al., "OAP: An Obstruction-Aware Cache Management Policy for STT-RAM Last-Level Caches", 2013 Design, Automation & Test in Europe Conference & Exhibition, 6 pgs., Mar. 2013.
(Continued)

*Primary Examiner* — Shawn X Gu
(74) *Attorney, Agent, or Firm* — Volpe Koenig (57) ABSTRACT

A technique for accessing a memory having a high latency portion and a low latency portion is provided. The technique includes detecting a promotion trigger to promote data from the high latency portion to the low latency portion, in response to the promotion trigger, copying cache lines associated with the promotion trigger from the high latency portion to the low latency portion, and in response to a read request, providing data from either or both of the high latency portion or the low latency portion, based on a state associated with data in the high latency portion and the low latency portion.

20 Claims, 7 Drawing Sheets

(56) References Cited

OTHER PUBLICATIONS

Mao, M., et. al., "Prefetching Techniques for STT-RAM Based Last-Level Cache in CMP Systems, 19th Asia and South Pacific Design Automation Conference", IEEE, 6 pgs., Jan. 2014.

Wang, Z., et. al., "Adaptive Placement and Migration Policy for an STT-RAM-Based Hybrid Cache" 20th International Symposium on High Performance Computer Architecture, IEEE, 12 pgs., Feb. 2014.

Smullen, C. W., et., al., "Relaxing Non-Volatility for Fast and Energy-Efficient STT-RAM Caches", 17th International Symposium on High Performance Computer Architecture, IEEE, 12 pgs., Feb. 2011.

Hameed, A., et. al., "Performance and Energy-Efficient Design of STT-RAM Last-Level Cache", IEEE Transactions an Very Large Scale Integration Systems, vol. 26, No. 6, IEEE, pp. 1059-1072, Jun. 2018.

Kultursay, E., et. al., "Evaluating STT-RAM as an Energy-Efficient Main Memory Alternative", 2013 IEEE International Symposium on Performance Analysis of Systems and Software, IEEE, pp. 256-267, Apr. 2013.

Gupta, S. & Zhou, H., "Spatial Locality-Aware Cache Partitioning for Effective Cache Sharing", 44th International Conference on Parallel Processing, 10 pgs., Sep. 2015.

\* cited by examiner

LATENCY HIDING FOR CACHES

STATEMENT OF GOVERNMENT INTEREST

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Memory bandwidth and latency are frequently a performance bottleneck for computing systems. Caches improve bandwidth and latency performance. Improvements to caches are therefore important to processor performance.

BRIEF DESCRIPTION OF THE DRAWINGS

A more detailed understanding can be had from the following description, given by way of example in conjunction with the accompanying drawings wherein.

DETAILED DESCRIPTION

A technique for accessing a memory having a high latency portion and a low latency portion is provided. The technique includes detecting a promotion trigger to promote data from the high latency portion to the low latency portion, in response to the promotion trigger, copying cache lines associated with the promotion trigger from the high latency portion to the low latency portion, and in response to a read request, providing data from either or both of the high latency portion or the low latency portion, based on state associated with data in the high latency portion and the low latency portion.

Figure 1:
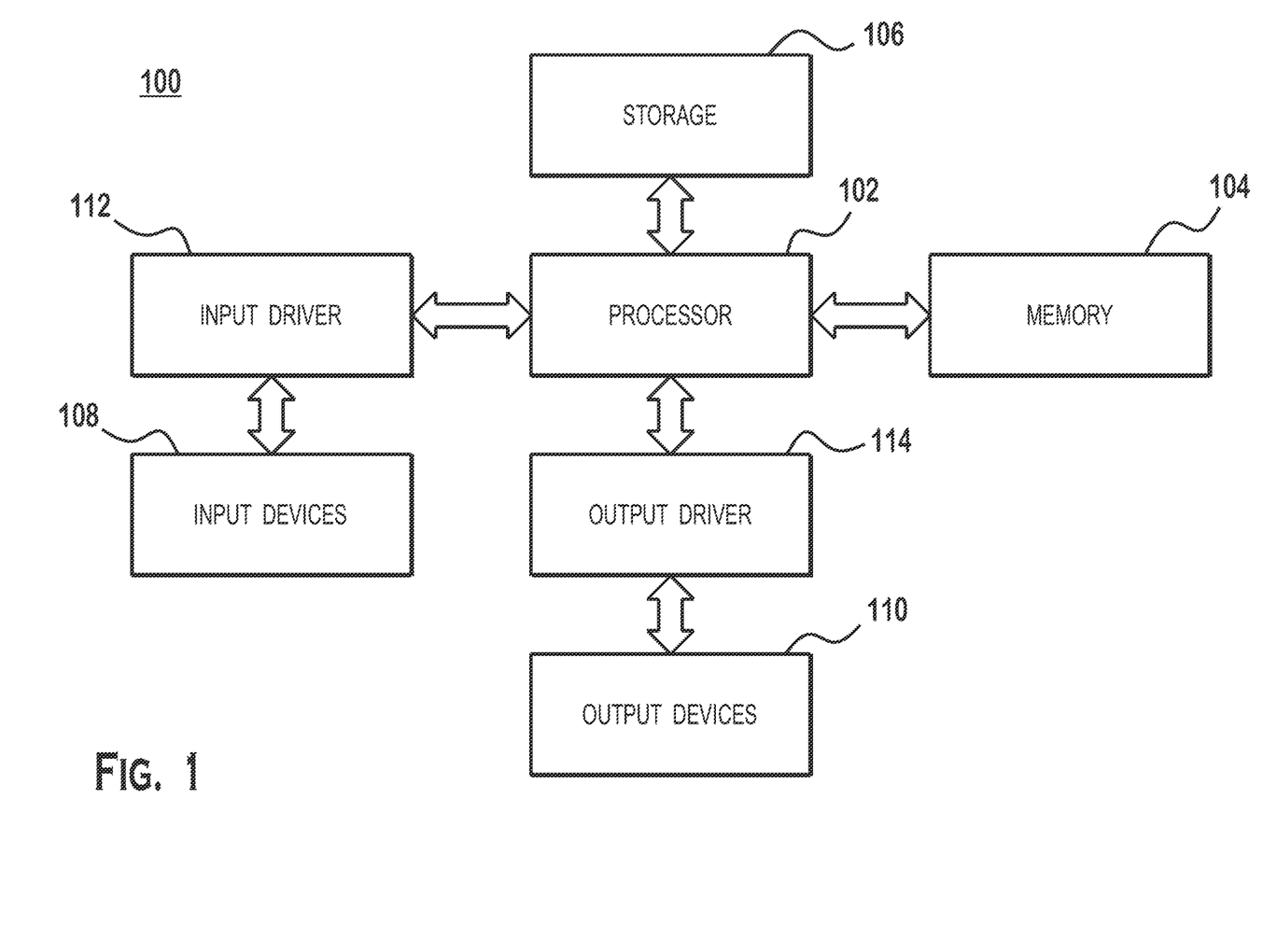
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In other alternatives, the processor 102 is any other technically feasible processor such as a digital signal processor, or any other type of processor. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
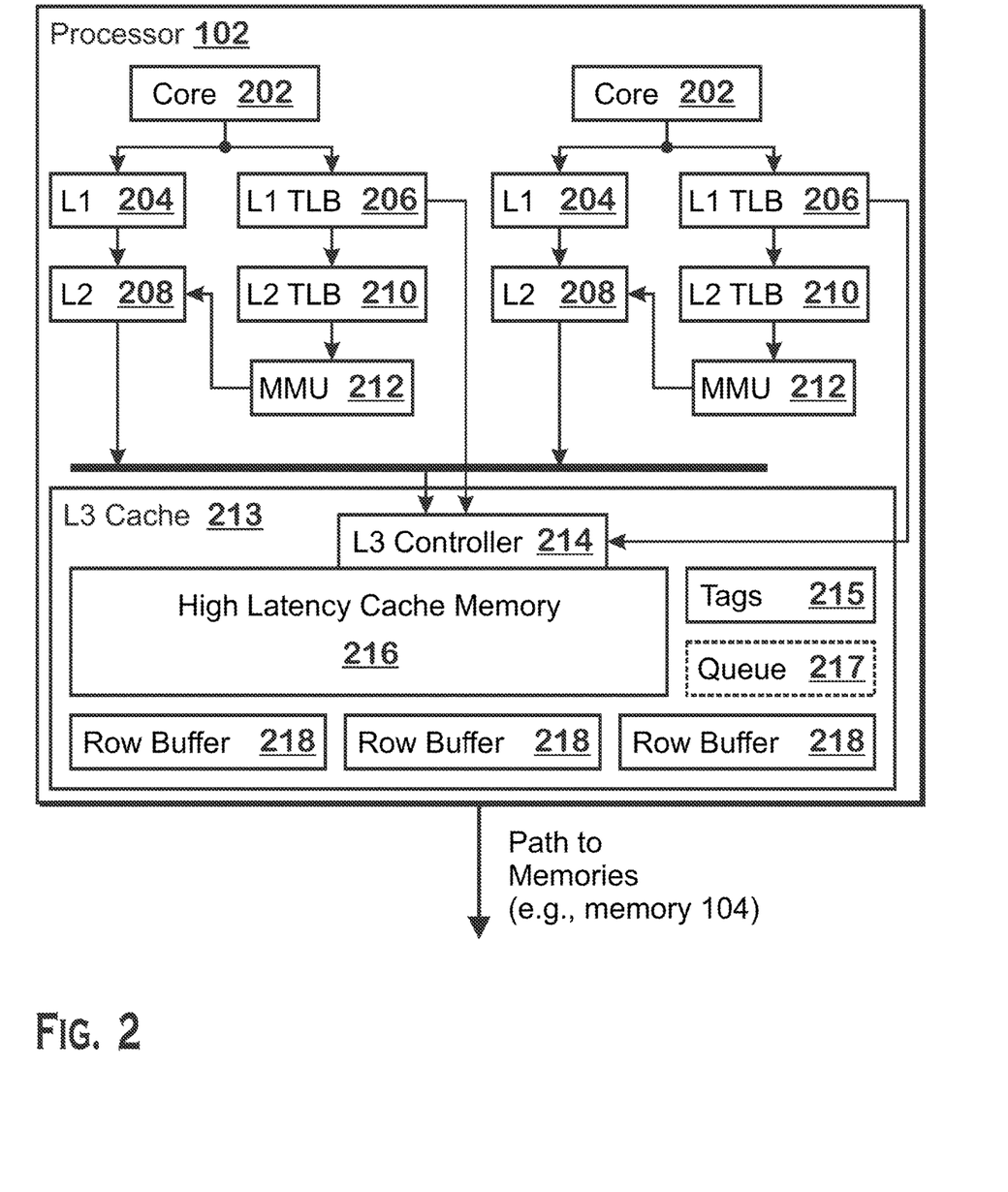
FIG. 2 is a block diagram of the processor, illustrating details of a cache hierarchy of the processor.

FIG. 2 is a block diagram of the processor 102, illustrating details of a cache hierarchy of the processor 102. As shown, the processor 102 includes various cache levels such as level 1 ("L1") caches 204, level 2 ("L2") caches 208, and a level 3 ("L3") cache 213. As is generally known, caches in a cache hierarchy hide or avoid latency for memory accesses by providing access to data deemed to be most likely to be used in the near future. In general, memory accesses from a core 202 attempt to access data in a lower level cache (e.g., level 1 cache 204) before a higher level cache (e.g., level 2 cache 208 or level 3 cache 213). Also shown are a level 1 translation lookaside buffer 206 and a level 2 translation lookaside buffer 210, as well as a memory management unit 212. A translation lookaside buffer ("TLB") is a cache for address translations from virtual memory addresses to physical memory addresses. In the particular configuration shown, for speed, the L1 cache 204 does not require address translation for being indexed into, but address translation is used for indexing into the L2 cache 208 and the L3 cache 213. However, in various alternative implementations, address translations are or are not used for either or both of tagging and indexing into the L1 cache. Note although in some implementations, the L1 cache is virtually indexed, and in other implementations, the L1 cache is not virtually indexed.

The L3 cache 213 includes a high latency cache memory 216, row buffers 218, and a level 3 cache controller 214. The L3 cache 213 is designed to take advantage of the improved storage density of memory technologies such as spin-transfer torque random-access memory. In addition to improved storage densities, which allows the L3 cache to have a greater storage capacity for the same chip real-estate, such memory technologies also feature reduced power consumption as compared with charge-based memory technologies like static random access memory (SRAM) and dynamic random access memory (DRAM). However, such memory technologies also suffer from higher access (read and write) latency as compared with other memory technologies such as SRAM and DRAM.

To hide the higher latency for reads, the L3 cache 213 includes row buffers 218 that buffer data for read operations. Specific details regarding to the manner in which the row buffers 218 operate are disclosed herein.

In the illustrated implementation, the L3 cache 213 is a shared cache that is shared between multiple cores 202. However, it should be understood that in various implementations, the teachings of the present disclosure are used for any type of cache memory, including a non-shared L3 cache or a cache at a different level of the cache hierarchy than the third level. Alternatively, the teachings of the present disclosure could be used for memories other than cache memories. In addition, in the illustrated implementation, the L3 cache 213 is described as being included within a processor 102. However, the teachings of the present disclosure could be applied to a cache or memory for any type of processor or external to a processor. In addition, although the illustrated implementation is described as using a specific type of high latency cache memory (e.g., spin-transfer torque random-access memory), the teachings provided herein are useful for reducing the latency of any type of memory.

The row buffers 218 have lower access latency but lower capacity than the high latency cache memory 216. In an example, the row buffers 218 are static random access memory (SRAM) but any technically feasible type of memory could be used.

Each row buffer 218 is populated with the cache lines that belong to a fixed size memory region and are resident in the high latency cache memory 216. Herein, the fixed size memory region, which is the size of a singular row buffer 218, is referred to herein as the "row buffer size" or the "row buffer memory region." In an alternative, the "row buffer memory region" is referred to as a "page" or "memory page" herein. In some implementations or situations, a row buffer does not correspond to the size of a page. Note, the fixed size memory region is a contiguous portion of the physical address space. In an example, the fixed size memory region is a memory page, and thus the row buffer 218 is populated with cache lines from the same page. Although it is possible to use any page size, in some examples, a page is 4 kilobytes (KB) and contains 64 cache lines, each having 64 bytes.

A cache line is a chunk of data of a particular size, such as 64 bytes. Cache lines are typically the smallest block of data operated on by a cache memory. More specifically, cache lines are written into the cache and read from the cache in units of cache lines and structures that mark the state for data in the cache typically do so on a cache-line granularity.

As described above, the row buffers 218 store cache lines from the same row buffer memory region. Thus, upon detecting a promotion trigger for a particular row buffer memory region, the L3 cache controller 214 "promotes" cache lines that are resident in the high latency cache memory 216 and that belong to the row buffer memory region into a row buffer 218. Promoting cache lines into a row buffer 218 involves finding all cache lines that belong to the row buffer memory region and are resident in the high latency cache memory 216, and placing those cache lines into a particular row buffer 218. Typical caches are not suitable for such operations because typically, data for different lines within a memory page is often scattered throughout the entire cache, and thus searching for all cache lines that are part of a memory page would require searching the entire cache, which would be impractical. For example, in some instances, cache lines within a single memory page are located in different sets or regions of the cache, which would entail several accesses to the cache, hurting performance.

In FIG. 2, the tags 215 include tags into the high latency cache memory 216. The queue 217 is present in some implementations and helps reduce the pressure on the tags 215 for determining whether cache lines are present in a row buffer 218, as will be explained in further detail below.

Figure 3:
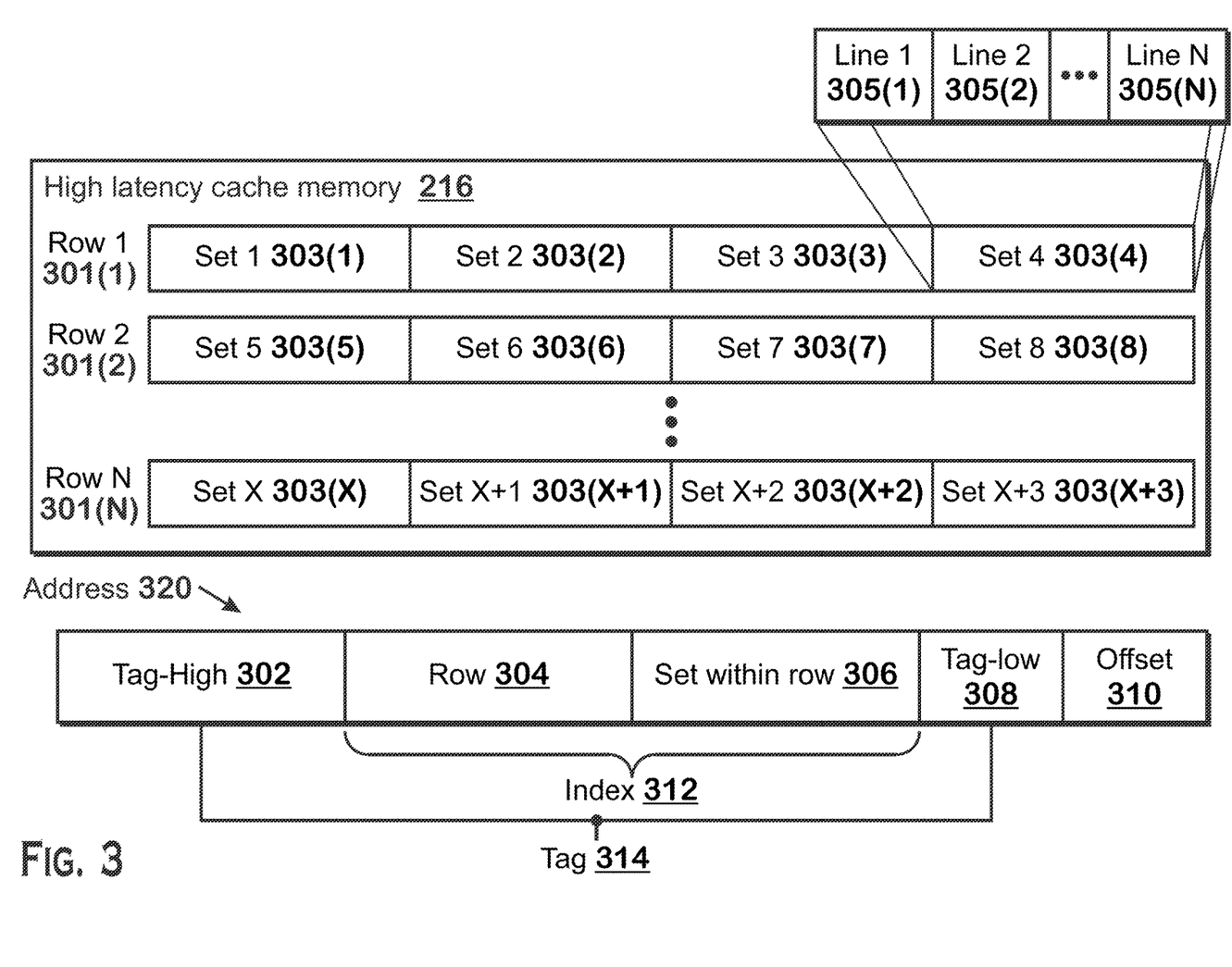
FIG. 3 illustrates an example cache layout and addressing scheme for the L3 cache that facilitates quickly searching for cache lines within a row buffer memory region for promotion of such cache lines into a row buffer.

FIG. 3 illustrates an example cache layout and addressing scheme for the L3 cache 213 that facilitates quickly searching for cache lines within a row buffer memory region for promotion of such cache lines into a row buffer 218. The high latency cache memory 216 is organized into rows 301. Each row includes multiple cache sets 303. Each set 303 includes multiple cache lines 305 according to the cache associativity.

As stated above, for cache line promotion from the high latency cache memory 216 to a row buffer 218, the L3 cache controller 214 searches for all cache lines within the row buffer memory region that are resident in the high latency cache memory 216 and places those cache lines into a row buffer 218. An addressing scheme is utilized that restricts placement of cache lines 305 within the high latency cache memory 216 such that all cache lines 305 in the same row buffer memory region are placed into the same row 301. This restriction allows the L3 cache controller 214 to search a single row 301 for all cache lines 305 to be promoted to a row buffer 218, instead of having to search all rows 301.

An example address 320 is shown that illustrates the addressing scheme. The address includes a tag-high portion 302, a row portion 304, a set within row portion 306, a tag-low portion 308, and an offset 310. Together, the row portion 304 and set within row portion 306 constitute the index 312. A tag 314 includes the tag-high portion 302 and tag-low portion 308. For any given address, the index 312 identifies the set 303 that the corresponding cache line can be found in. Together, the index 312 and tag 314 identify a specific cache line. A tag match in an identified set 303 during lookup indicates that the cache line referenced by an address is in the high latency cache memory 216 and if no tag match occurs, the associated cache line is not resident in the high latency cache memory 216. The tag used for the tag match includes both the tag-high bits 302 and the tag-low bits 308.

In the addressing scheme used by the high latency cache memory 216, the tag 314 is split between high and low portions. This split allows the row portion 304 of the index 312 to refer to the same row 301 for a given row buffer memory portion. More specifically, the portion of the address that is lower order than the row portion 304 of the address 320 includes a number of bits that is sufficient to specify an address within a row buffer memory portion. However, none of these bits are used to identify a row buffer memory portion. In the example where the row buffer memory portion is a memory page, the bits to the right of the row portion 304 of the address 320 include none of the bits of the page number, which is the portion of the address that identifies the memory page in which the address falls.

In an example, the address 320 is a 48 bit address. The offset 310 includes bits 0 to 5. The lower portion of the tag 308 includes bits 6 to 9. The index 312 includes bits 10 through 24. Within the index 312, the portion that specifies the set within a row 306 includes bits 10 to 11 and the portion that specifies the row 304 includes bits 12 through 24. The high portion of the tag 302 includes bits 25 to 47. The page size is 4 kilobytes (KB), the cache associativity is 16-way, and the cache line is 64 bytes. Each set has the capacity to store 16 cache lines and there are four sets in a row 301. The offset 310 identifies a byte within a cache line. A given index 312 value identifies both a specific row 301 and a specific set 303 within that row. Thus varying the low portion of the tag or the offset 310 for a given index value 312 will not change what set 303 and row 301 an address maps to. Once a set 303 and row 301 are identified, the tag 314 is used to determine whether a hit occurs.

In the addressing scheme described above, any given index 312 value identifies a particular set in a particular row 301 and any given row value 304 for the portion of the index identifies a particular row 301. Regardless of the values of the bits that are lower order than the row 304 value, the address maps to the same row 301. Thus, for the memory granularity represented by such lower order bits (e.g., a page), any values for such bits map to the same row 301. For the 4 KB page example, where the bits that are lower order than the row 304 bits, such bits represent an offset into the 4 KB page, whereas the row portion 304 itself plus the tag-high 302 bits identify a specific 4 KB page. Thus addresses within the row buffer memory portion (e.g., 4 KB page) all map to the same row 301.

Splitting the tag 314 allows such consistency of mapping to occur. More specifically, in traditional cache addressing schemes, the tag is the highest order bits. However, with such schemes, the index is pushed into the bits that identify the memory page. Thus a different memory page maps to a different row in traditional cache addressing schemes. By placing a portion of the tag to the right of the index 312, the index 312 is pushed towards higher order bits, so that a change in the bits that identify the row buffer memory portion does not result in a change to the row 301 to which that row buffer memory portion is mapped.

In sum, the addressing scheme illustrated allows for quick searching for cache lines in a row buffer memory portion by restricting cache lines that fall within the same row buffer memory portion to a single row 301.

In FIG. 3, although certain features are shown with a particular number of elements, any number of elements for the various features could alternatively be used. For example, the high latency cache memory 216 is shown as including four sets 303 per row. However, any number of sets per row could alternatively be used. In some implementations, there are at least two sets 303 per row 301. In some implementations, the number of sets per row is dictated by the size of the memory region, the cache associativity, and the cache line size. In an example, for a 4 KB memory region, 64 byte cache line size, and 16-way cache, there are 64 cache lines per memory region, because 4 KB/64B equals 64. In this example, the 64 lines are organized in 16-way sets due to the cache associativity, meaning that there are 64/16=4 sets per row. In an alternative, the cache is 8-way associative, and stores 64/8=8 sets per row. In an alternative, the row size is 8 KB and the cache is 16-way associative. In this alternative, there are 8 KB/64=128 lines per row and 128/16=8 sets per row. Other alternatives are possible.

As stated above, upon a promotion trigger event occurring, the L3 cache controller 214 promotes all of the lines that are resident in the high latency cache memory 216 to a row buffer 218. In some implementations, a promotion trigger event is the following events all occurring: a miss in a level 1 TLB (in some implementations, a level 1 data TLB), a fill to the level 1 TLB, and a determination that sufficient activity occurred for the page for which the miss in the L1 TLB occurred. As is generally known, a fill to a cache (such as the TLB) is placing data (such as an address translation) into the cache, which generally occurs in response to a cache miss (although a fill can occur for other reasons).

In some implementations, "sufficient activity for the page for which a miss in a L1 TLB occurred" happens when a number of accesses to the page have occurred, where the number is above a threshold. In an example, if the threshold is 10, then if 10 accesses to page 1000 have occurred in the past prior to a fill occurring in the L1 TLB for that page, then that constitutes "sufficient activity" and is a promotion trigger event. In other implementations, sufficient activity is deemed to occur simply when the fill occurs—i.e., any L1 TLB fill triggers a promotion event. In some implementations, the L1 TLB stores data indicating how many cache lines have been accessed in the past for each page for which a translation is stored in the L1 TLB. In some implementations, such information follows the address translation when the address translation is evicted to a lower-level TLB such as a level 2 TLB or even to page tables in main memory. It is also possible for translations to be evicted to other memory structures that are not a TLB. It is possible for a translation that has been evicted to a memory to lose the cache line access tracking data, in which case when the translation is again brought into the L1 TLB, the L1 TLB initializes such data with an initialization value such as all zeroes (e.g., values indicating that no accesses to the caches line of the pages have occurred). In some instances, the L1 TLB modifies the cache line access data to indicate that accesses to the line that triggered the L1 TLB miss, as well as subsequent accesses to the same page, have occurred.

In the above implementations, an L1 TLB fill triggers a promotion event because such a fill is a hint that data that is not in the level 1 or level 2 cache, and which is possibly in the level 3 cache, will soon be used.

As described above, an L1 TLB triggers a promotion event for a particular page. The L3 cache 213 performs the promotion event by copying cache lines that are resident in the high latency cache memory 216 and that are in the page into a row buffer 218. Specifically, the L3 cache controller 214 copies all cache lines in the high latency cache memory 216 into a single row buffer 218. Any technically feasible replacement policy for the row buffers 218 could be used. More specifically, when a promotion event occurs, the L3 controller 214 selects a row buffer 218 to store the cache lines for the promotion event according to any technically feasible replacement policy. In some implementations, the L3 controller 214 prioritizes row buffers 218 that store no valid cache lines or row buffers 218 with the lowest number of hits from accesses to the high latency cache 216.

As described elsewhere herein, tags 215 are used to identify whether particular cache lines are resident in the high latency cache memory 216. In some implementations, to identify whether cache lines are in a row buffer 218, the L3 cache controller 214 uses a queue structure 217. The queue 217 operates in the following manner. When a new page is promoted to the row buffer 218, the L3 controller 214 generates a new entry in the queue 217. Each entry in the queue 217 is associated with a single physical page. In addition, each entry in the queue 217 includes a bit vector that indicates which cache lines in the physical page are stored in a row buffer 218. In some implementations, the queue 217 includes a number of entries equal to the number of row buffers 218 in the L3 cache 213. In some implementations, when the L3 cache controller 214 evicts a page from the row buffers 218, the L3 cache controller 214 invalidates the corresponding entry in the queue 217. The queue 217 is a content addressable memory that is addressable by physical page number. For requests to read a cache line, the L3 cache controller 214 probes the queue 217 based on the physical page number, and, if there is a hit, uses the bit vector of the corresponding queue entry to identify which cache lines are in the row buffers 218.

In some implementations, the TLB stores, for each TLB entry of the L1 TLB 206 (each of which corresponds to a particular memory page), a bit vector indicating the cache lines of the associated page that have been accessed (read from or written to). In such implementations, when the memory page associated with a TLB entry is promoted to a row buffer 218, the L3 controller 214 copies only those cache lines that are both resident in the high latency cache memory 216 and are indicated as having been accessed by the bit vector. In some implementations, the bit vector is saved with the address translation when the address translation is evicted to a lower level TLB such as the L2 TLB 210, to page tables, or to another structure. If the translation is evicted to a structure that does not store the bit vector, then when the translation is read back into the L1 TLB 206, the L1 TLB 206 initializes the bit vector with data indicating one or more cache lines that caused the translation to be filled into the L1 TLB 206.

Figure 4:
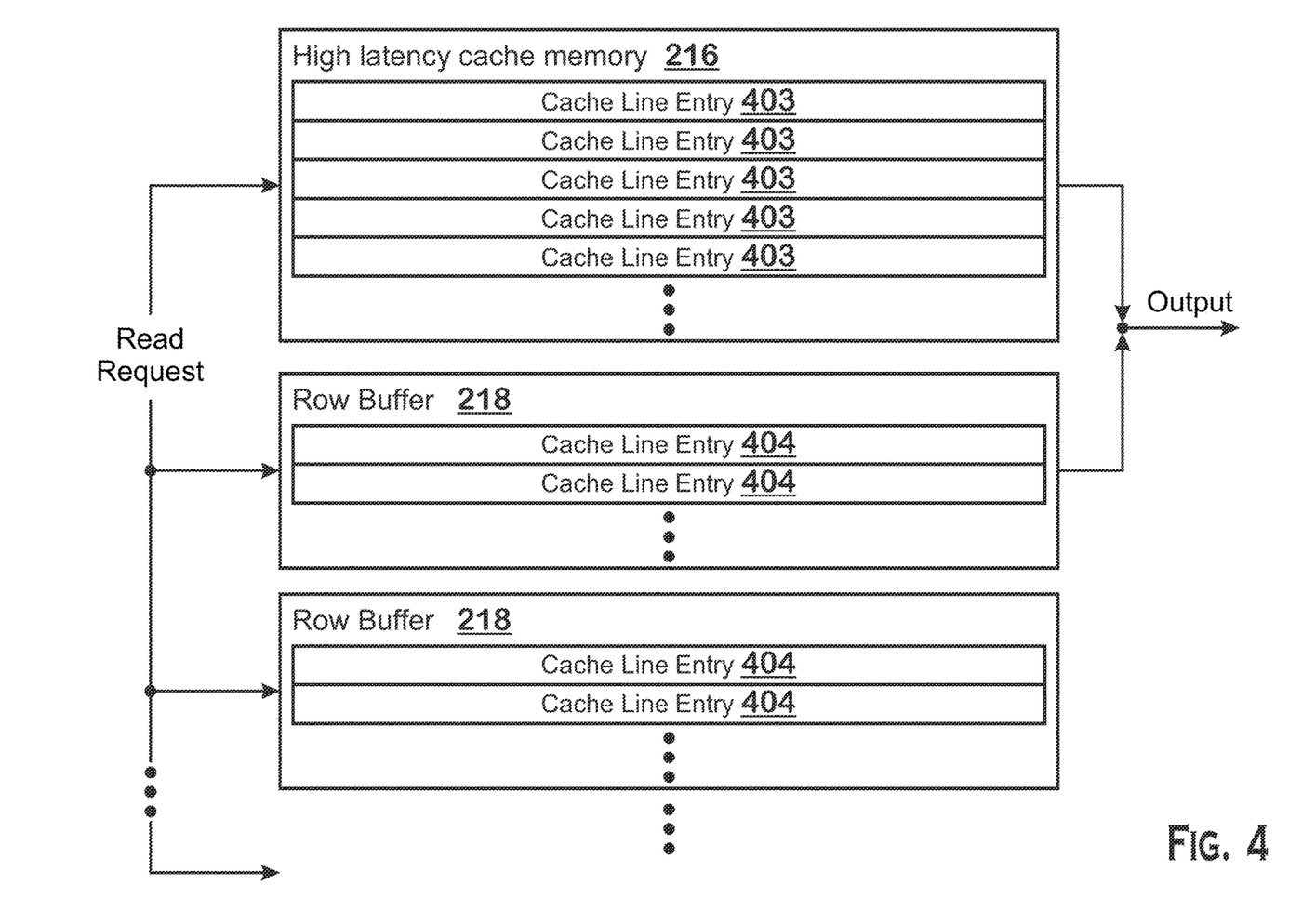
FIG. 4 illustrates a read operation, according to an example.

FIG. 4 illustrates a read operation, according to an example. As shown, each row buffer 218 includes a plurality of cache line entries 404 that can store cache lines, and the high latency cache memory 216 includes a plurality of cache line entries 403 that can store cache lines. A read request to specific cache lines in the L3 cache 213 occurs in parallel in the row buffers 218 and the high latency cache memory 216. Specifically, when the L3 controller 214 receives a request to read a cache line from the L3 cache 213, the L3 controller 214 sends the request to both the row buffers 218 and the high latency cache memory 216. If the requested cache lines are not in any row buffers 218, the L3 controller 214 provides cache lines from the high latency cache memory 216 to the requestor. In some situations, requests to different cache lines are serviced simultaneously from either the row buffers 218 or from the high latency cache memory 216 to the requestors.

The L3 controller 214 does not apply write operations to the row buffers 218. If a write operation occurs to a cache line that is stored in a row buffer 218, then the L3 controller 214 updates the contents of the cache line in the high latency cache memory 216 and marks that cache line as dirty. If a cache line is marked as dirty in the high latency cache memory 216, then the L3 controller 214 does not respond to a read request with data in a row buffer 218 and instead responds with data in the high latency cache memory 216.

It is possible for there to be a memory page within which some non-dirty cache lines are stored in a row buffer 218 and others are stored in the row buffer 218 but are marked as dirty. In that situation, the L3 controller 214 returns the non-dirty lines from the row buffer 218 and returns the dirty lines from the high latency cache memory 216.

The tags 215 are used to determine whether the high latency cache memory 216 stores a particular cache line. Specifically, the tags 215 include the tags into the high latency cache memory 216 and indicate which cache lines 404 are stored in the high latency cache memory 216. If an access request hits in the tags 215, then the associated cache line is resident in the high latency cache memory 216.

In addition to including tags, the tags 215 also include information such as dirty bits. The dirty bits of the tags 215 indicate whether to read from the row buffer 218 or from the high latency cache memory 216. Specifically, if a cache line is dirty, then the L3 controller 214 fetches the cache line from the high latency cache memory 216 and if the cache line is not dirty, then the L3 controller 214 fetches the cache line from the row buffer 218 if the data is in the row buffer. Note that a cache line in a row buffer 218 is considered dirty if the corresponding data in the high latency cache memory 216 is dirty, even if the data for the cache line in the row buffer 218 is different than the data for the cache line in the high latency cache memory 216, which sometimes occurs because writes are applied to cache lines in the high latency cache memory 216 and not in the row buffer 218.

In implementations in which the queue 217 is used, the queue 217 indicates whether a cache line is in a row buffer 218. Specifically, as described above, the queue includes entries, each of which is associated with a different page. In addition, each entry in the queue includes a set of indicators (each of which, in some implementations, is a bit), where each indicator indicates whether a cache line associated with the indicator is resident in the row buffer 218. In implementations that do not use a queue 217, any other technically feasible technique could be used to store indications of whether cache lines are resident in the row buffers 218.

Figure 5:
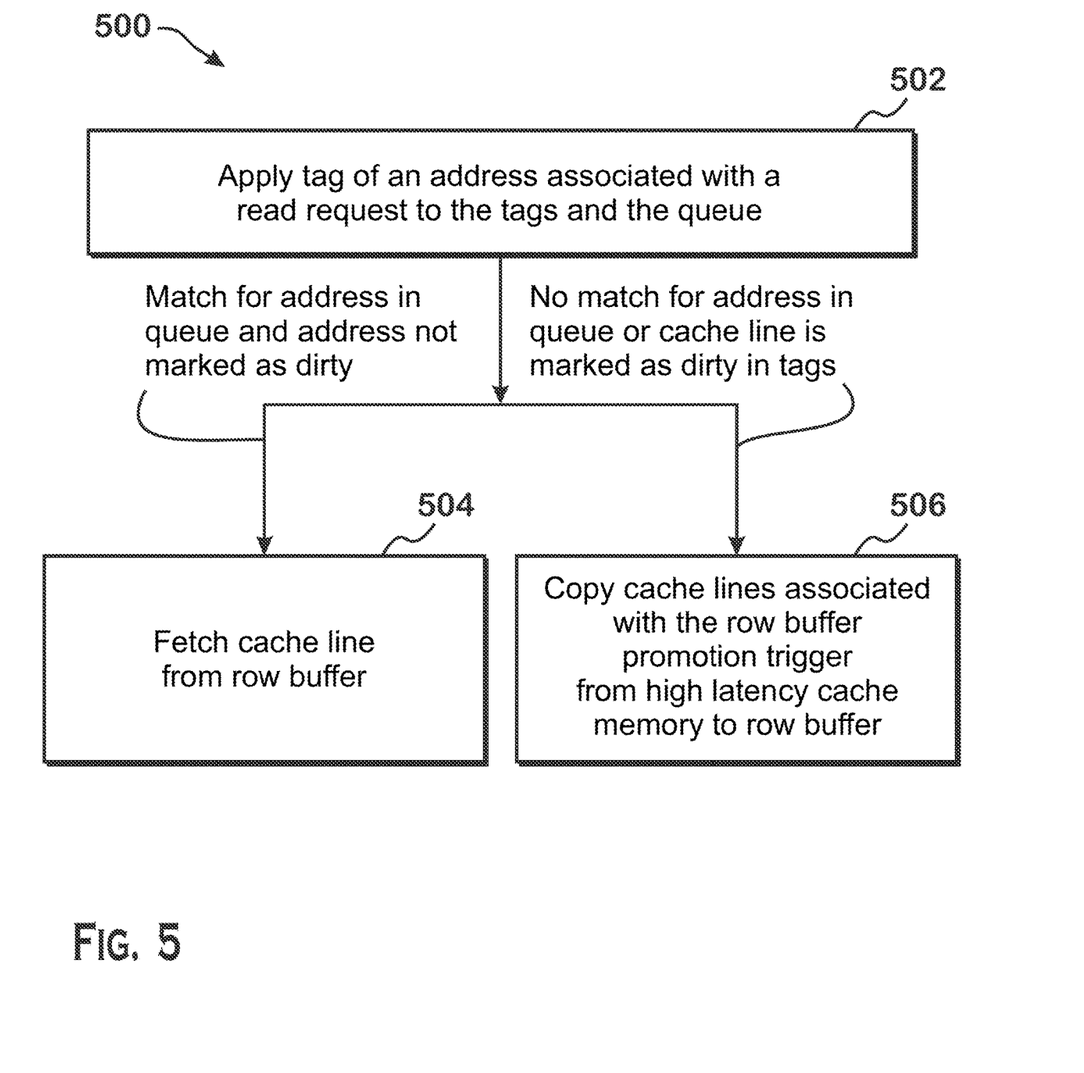
FIG. 5 is a flow diagram of a method for processing a read request based on the tags and queue, according to an example.

FIG. 5 is a flow diagram of a method 500 for processing a read request based on the tags 215 and queue 217, according to an example. Although described with respect to the system of FIGS. 1-4, those of skill in the art will understand that any system that performs the steps of method 500 in any technically feasible order falls within the scope of the present disclosure.

At step 502, to process a read request, the L3 controller 214 applies the tag of the address associated with the read request to the tags 215 and the queue 217. If there is a match for the address in the queue 217 and the address is not marked as dirty in the tags 215, then the method 500 proceeds to step 504 and if there is not a match for the address in the queue 217, or if the cache line is marked as dirty in the tags 215, then the method 500 proceeds to step 506. At step 504, the L3 controller 214 fetches the cache line from the row buffer 218. At step 506, the L3 controller 214 fetches the cache line from the high latency cache memory 216.

In the case that a row buffer 218 stores cache lines for a particular memory page, and additional cache lines are filled into the high latency cache memory 216, those cache lines are also written into the row buffer 218. Thus at any particular time, the row buffer 218 stores all cache lines for a particular memory page that are also stored in the high latency cache memory 216.

Figure 6:
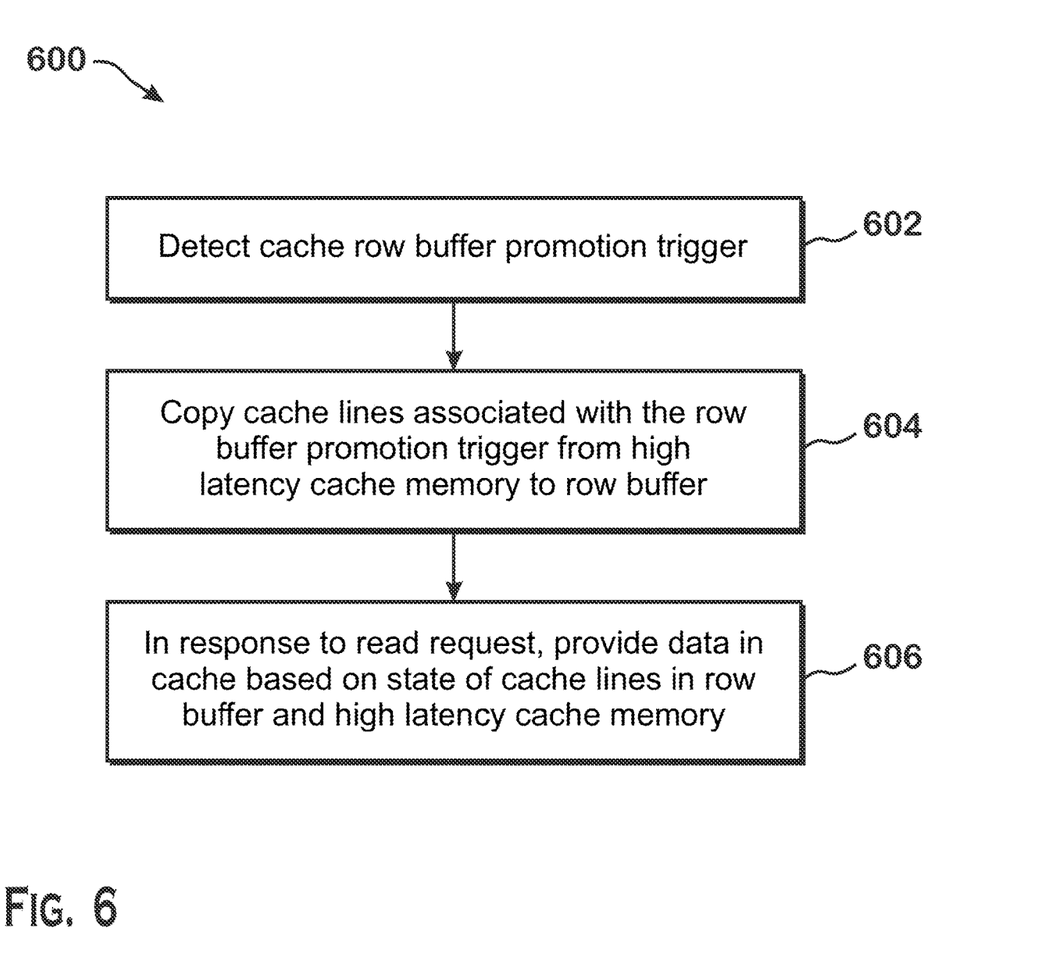
FIG. 6 is a flow diagram of a method for operating a cache with row buffers, according to an example.

FIG. 6 is a flow diagram of a method 600 for operating a cache with row buffers, according to an example. Although described with respect to the system of FIGS. 1-4, those of skill in the art will understand that any system configured to perform the steps of method 600 in any technically feasible order falls within the scope of the present disclosure.

At step 602, the L3 controller 214 detects a cache row buffer promotion trigger. A cache row buffer promotion trigger is an event that indicates to the L3 controller 214 that cache lines should be copied ("promoted") from the high latency cache memory 216 into a row buffer 218. Some example row buffer promotion triggers are described herein. One such example includes detecting a fill of a TLB entry for a level 1 TLB 206, along with a determination that sufficient activity for the page for which the fill occurs has happened.

In some examples, "sufficient activity" is a number of accesses being over a threshold, where the accesses occur to the page for which the TLB entry has been filled. In other implementations, other row buffer promotion triggers are used.

At step 604, in response to the row buffer promotion trigger, the L3 controller 214 copies cache lines associated with (where "associated with" means inherently or explicitly specified by) the row buffer promotion trigger from the high latency cache memory 216 into a row buffer 218. In some implementations where the promotion trigger is an L1 TLB fill, the associated cache lines are cache lines that are within the page for which the L1 TLB fill occurs and that are also resident within the high latency cache memory 216. In some examples, the L1 TLB 206 stores a bit vector for each entry as described elsewhere herein. The bit vector records which cache lines of the page associated with the TLB entry have been accessed. In these examples, the associated cache lines are the cache lines that are resident in the high latency cache memory 216 and that are also indicated as having been accessed by the bit vector. Note that in some implementations, the bit vector is evicted along with the TLB entry when that entry is evicted from the L1 TLB 206. It is possible that the translation will be evicted to a memory that does not store the bit vector, in which case the access history information is lost. If the access information history is lost, then the L1 TLB 206 starts with the bit vector initialized to all zeroes (or to values indicating that no cache lines have been accessed) when the L1 TLB 206 is filled with the translation again. In that instance, the L1 TLB 206 includes information indicating one or more cache line accesses that occurred since the L1 TLB miss that caused the fill to occur, including the cache line that caused the L1 TLB miss to occur.

At step 606, in response to a read request to the L3 cache 213, the L3 controller 214 provides data in the cache to the requestor, based on the state of the row buffers 218, and the state of the high latency cache memory 216.

Figure 7:
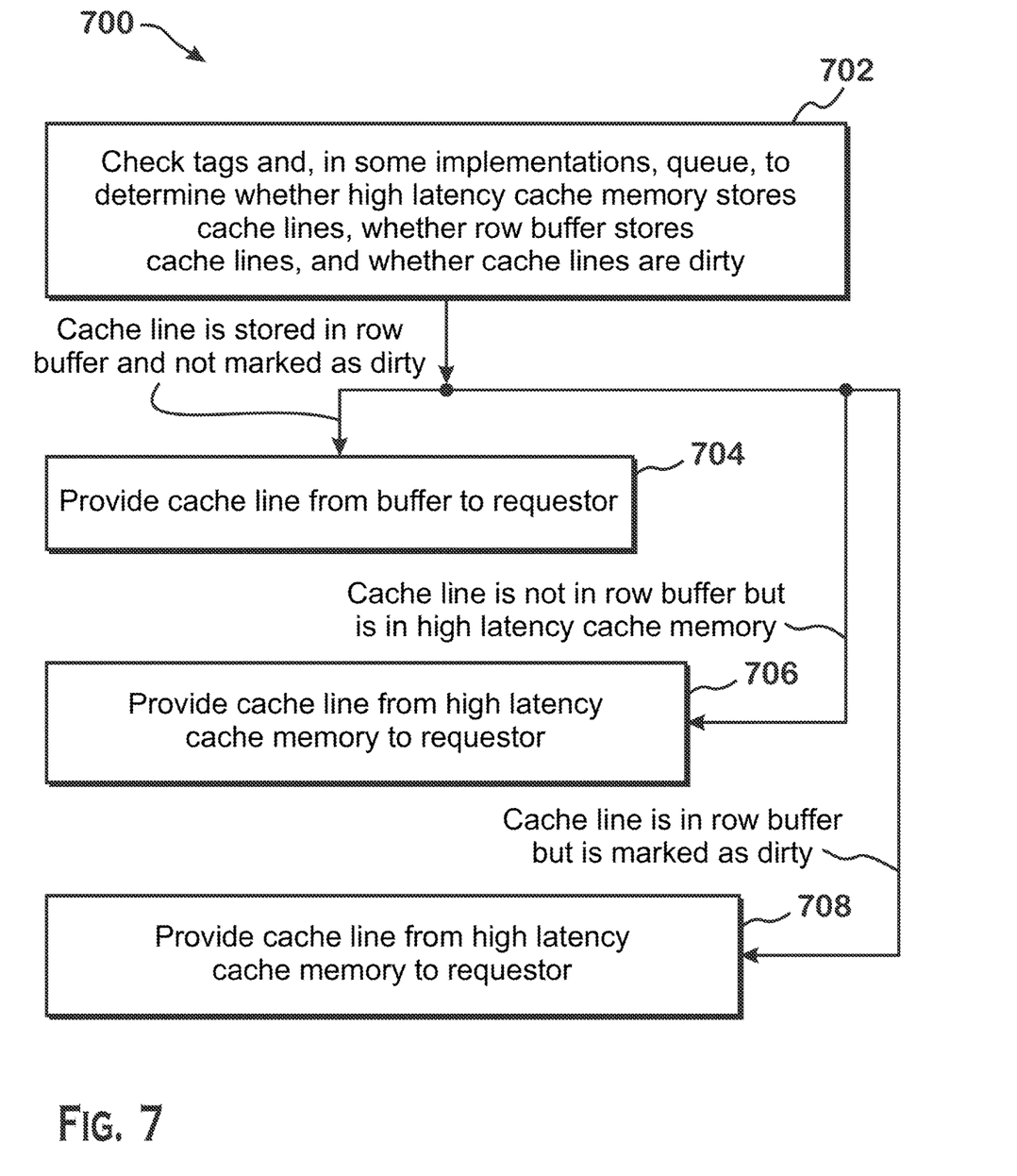
FIG. 7 is a flow diagram of a method for providing data in the cache to the requestor, based on the state of the row buffers and the state of the high latency cache memory, according to an example.

FIG. 7 is a flow diagram of a method 700 for providing data in the cache to the requestor, based on the state of the row buffers 218 and the state of the high latency cache memory 216, according to an example. Although described with respect to the system of FIGS. 1-4, those of skill in the art will understand that any system that performs the steps of method 700 in any technically feasible order falls within the scope of the present disclosure.

At step 702, the L3 controller 214 checks tags 215, and, in implementations where the queue 217 is used, the queue, to determine whether the high latency cache memory 216 stores the cache lines, whether the row buffers 218 store the cache lines, and whether the cache lines are dirty. If a cache line is stored in the row buffer 218 and is not marked as dirty, then the method 700 proceeds to step 704. At step 704, the L3 controller 214 provides a cache line that is stored in the row buffer 218 and not marked as dirty to the requestor.

Returning to step 702, if the cache line is not in the row buffers 218 but is in the high latency cache memory 216, then the method 700 proceeds to step 706. At step 706, the L3 controller 214 provides that cache line from the high latency cache memory 216 to the requestor.

Returning to step 702, if the cache line is in the row buffers 218 but is marked as dirty in the high latency cache memory 216, then the method proceeds to step 708. At step 708, the L3 controller provides such cache line from the high latency cache memory 216 to the requestor. Note that for writes that occur to the L3 cache 213, the L3 controller 214 updates the cache lines in the high latency cache memory 216 and marks such lines as dirty, but does not update the values in the row buffers 218.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, and the cores 202) are, in various implementations, implemented as an appropriate one or more of a general purpose computer, a processor, or a processor core, or a program, software, or firmware, stored in a non-transitory computer readable medium or in another medium, executable by a general purpose computer, a processor, or a processor core, or by custom circuitry. The L1 cache 204, the L2 cache 208, the L3 cache 213, including the L3 controller 214, the high latency cache memory 216, and the row buffers 218, the L1 TLB 206, the L2 TLB 210, and the MMU 212 are, in various implementations, implemented as fixed function circuits, or, for elements that perform control functions, as either fixed function circuitry or as software or firmware executing on an appropriate processor. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of accessing a memory having a high latency portion and a low latency portion, the method comprising:
    detecting a promotion trigger to promote data from the high latency portion to the low latency portion, wherein the promotion trigger includes one of a miss in a translation lookaside buffer, a fill to the translation lookaside buffer, or a determination that a number of accesses to a first page have occurred, wherein the first page comprises a page for which a miss occurred in the translation lookaside buffer;

in response to the promotion trigger, copying cache lines associated with the promotion trigger from the high latency portion to the low latency portion; and in response to a read request, providing data from either or both of the high latency portion or the low latency portion, based on a state associated with data in the high latency portion and the low latency portion.

2. The method of claim 1, further comprising:

probing the high latency portion and the low latency portion in at least partially overlapping time periods to identify whether to provide the data from the high latency portion or the low latency portion.

3. The method of claim 1, wherein:

the state associated with data in the low latency portion is stored in a queue separate from a tag structure for the high latency portion; and the queue stores queue entries, each of which is associated with a particular physical page and which stores indications of which cache lines are stored in the low latency portion.

4. The method of claim 1, wherein detecting the promotion trigger comprises detecting the fill to the translation lookaside buffer.

5. The method of claim 4, wherein:

the fill to the translation lookaside buffer comprises a fill of a translation lookaside buffer entry for a memory page; and the cache lines associated with the promotion trigger comprise cache lines that are resident in the high latency portion that are within the memory page.

6. The method of claim 1, wherein providing data from either or both of the high latency portion or the low latency portion, based on the state associated with data in the high latency portion and the low latency portion comprises:

providing a cache line stored in the low latency portion in response to determining that the cache line is resident in the low latency portion and is not marked as dirty.

7. The method of claim 1, wherein providing data from either or both of the high latency portion or the low latency portion, based on the state associated with data in the high latency portion and the low latency portion comprises:

providing a cache line stored in the high latency portion in response to determining that the cache line is resident in the high latency portion but not in the low latency portion.

8. The method of claim 1, wherein providing data from either or both of the high latency portion or the low latency portion, based on the state associated with data in the high latency portion and the low latency portion comprises:

providing a cache line stored in the high latency portion in response to determining that the cache line is resident in both the high latency portion and the low latency portion and that the cache line is marked as dirty.

9. The method of claim 1, further comprising:

in response to a write operation to a cache line stored in both the high latency portion and the low latency portion, updating the cache line in the high latency portion, and marking the cache line as dirty, wherein the cache line is not updated in the low latency portion in response to the write operation.

10. A memory, comprising:

a low latency memory portion;

a high latency memory portion; and a controller, configured to:

detect a promotion trigger to promote data from the high latency portion to the low latency portion, wherein the promotion trigger includes one of a miss in a translation lookaside buffer, a fill to the translation lookaside buffer, or a determination that a number of accesses to a first page have occurred, wherein the first page comprises a page for which a miss occurred in the translation lookaside buffer;

in response to the promotion trigger, copy cache lines associated with the promotion trigger from the high latency portion to the low latency portion; and in response to a read request, provide data from either or both of the high latency portion or the low latency portion, based on a state associated with data in the high latency portion and the low latency portion.

11. The memory of claim 10, wherein the controller is further configured to probe the high latency portion and the low latency portion in at least partially overlapping time periods to identify whether to provide the data from the high latency portion or the low latency portion.

12. The memory of claim 10, wherein:

the state associated with data in the low latency portion is stored in a queue separate from a tag structure for the high latency portion; and the queue stores queue entries, each of which is associated with a particular physical page and which stores indications of which cache lines are stored in the low latency portion.

13. The memory of claim 10, wherein detecting the promotion trigger comprises detecting the fill to the translation lookaside buffer.

14. The memory of claim 13, wherein:

the fill to the translation lookaside buffer comprises a fill of a translation lookaside buffer entry for a memory page; and the cache lines associated with the promotion trigger comprise cache lines that are resident in the high latency portion that are within the memory page.

15. The memory of claim 10, wherein providing data from either or both of the high latency portion or the low latency portion, based on the state associated with data in the high latency portion and the low latency portion comprises:

providing a cache line stored in the low latency portion in response to determining that the cache line is resident in the low latency portion and is not marked as dirty.

16. The memory of claim 10, wherein providing data from either or both of the high latency portion or the low latency portion, based on the state associated with data in the high latency portion and the low latency portion comprises:

providing a cache line stored in the high latency portion in response to determining that the cache line is resident in the high latency portion but not in the low latency portion.

17. The memory of claim 10, wherein providing data from either or both of the high latency portion or the low latency portion, based on the state associated with data in the high latency portion and the low latency portion comprises:

providing a cache line stored in the high latency portion in response to determining that the cache line is resident in both the high latency portion and the low latency portion and that the cache line is marked as dirty.

18. The memory of claim 10, wherein the controller is further configured to:

in response to a write operation to a cache line stored in both the high latency portion and the low latency portion, updating the cache line in the high latency portion, and marking the cache line as dirty, wherein the cache line is not updated in the low latency portion in response to the write operation.

19. A processor, comprising:
one or more processor cores; and
a cache hierarchy including a level 3 cache, the level 3 cache comprising:
   a low latency memory portion;
   a high latency memory portion; and
   a controller, configured to:
      detect a promotion trigger to promote data from the high latency portion to the low latency portion, wherein the promotion trigger includes one of a miss in a translation lookaside buffer, a fill to the translation lookaside buffer, or a determination that a number of accesses to a first page have occurred, wherein the first page comprises a page for which a miss occurred in the translation lookaside buffer;
      in response to the promotion trigger, copy cache lines associated with the promotion trigger from the high latency portion to the low latency portion; and
      in response to a read request, provide data from either or both of the high latency portion or the low latency portion, based on a state associated with data in the high latency portion and the low latency portion.

20. The processor of claim 19, wherein the controller is further configured to probe the high latency portion and the low latency portion in at least partially overlapping time periods to identify whether to provide the data from the high latency portion or the low latency portion.

* * * * *